March 22, 1960  F. E. GILMORE  2,929,772
HYDROCARBON REFORMING
Filed Oct. 15, 1957
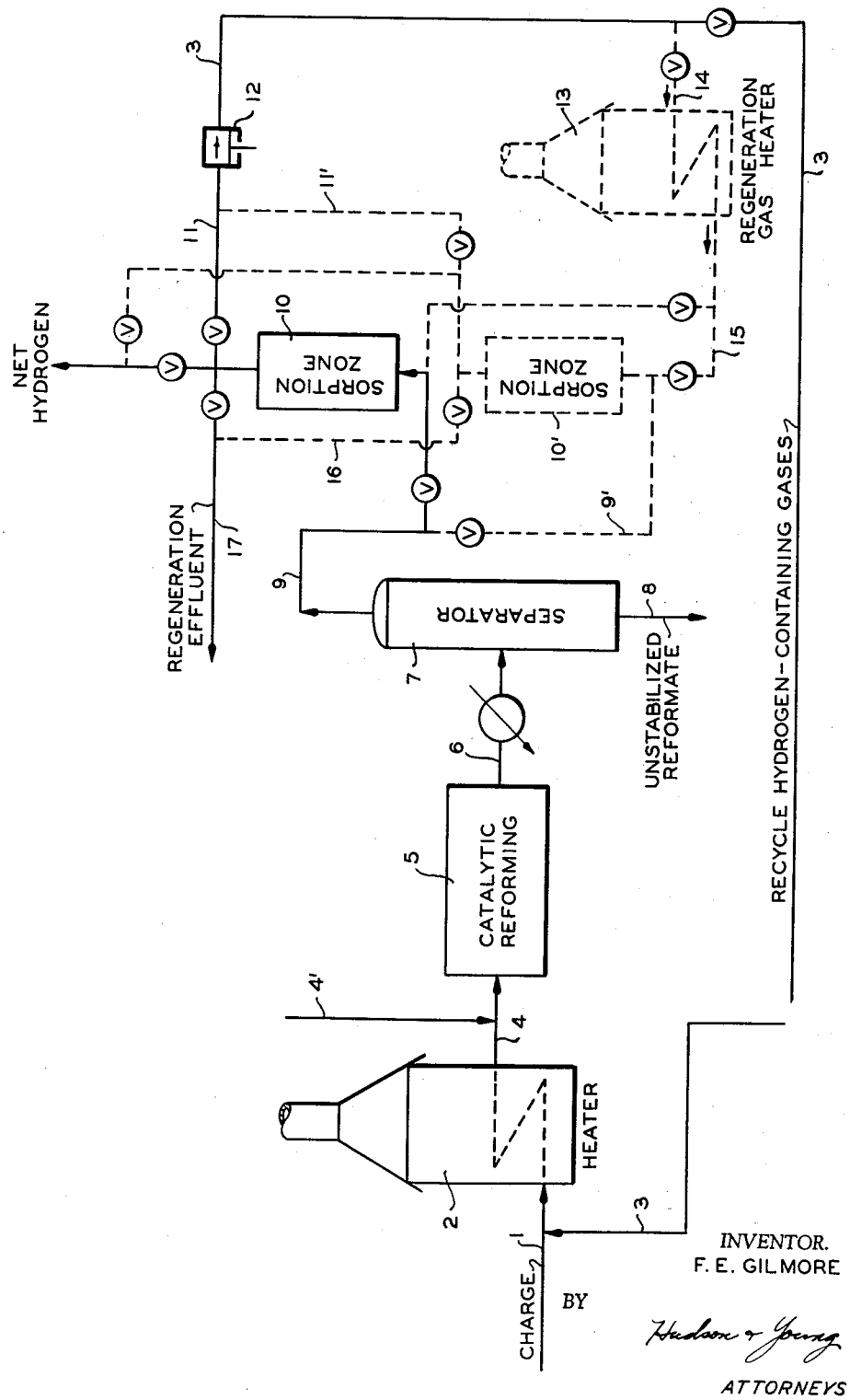
INVENTOR.
F. E. GILMORE
BY
Hudson & Young
ATTORNEYS.

United States Patent Office 2,929,772
Patented Mar. 22, 1960

2,929,772

HYDROCARBON REFORMING

Forrest E. Gilmore, Bartlesville, Okla., assignor to Phillips Petroleum Company, a corporation of Delaware Application October 15, 1957, Serial No. 690,294

6 Claims. (Cl. 208—99)

This invention relates to hydrocarbon reforming. In one of its aspects, the invention relates to a process in which a hydrocarbon is reformed under conditions providing in the gases recovered from the conversion zone ammonium chloride which is prevented from depositing in a gas-compressing zone by contacting said gases with an adsorbent or absorbent upstream or downstream of the gas-compressing zone to remove ammonium chloride or ammonium chloride-forming components therefrom. In another of its aspects, the invention relates to a process, as described, wherein adsorbents which are used include activated charcoal, activated alumina, silica gel, molecular sieves and other selective adsorbents such as coke. In a further aspect, the invention contemplates the regeneration of the adsorbent using hot hydrogen which is available in the process.

The hydrocarbon reforming art is now well developed. In one kind of reforming operation which has been described, hydrogen and a gasoline stock are passed into a catalytic reforming zone in which they are contacted with a platinum-containing reforming catalyst at a temperature maintained in the approximate range of 800–950° F. and a pressure of about 500–800 p.s.i.g. The products of the reaction ordinarily include upgraded gasoline constituents, hydrogen and other gases. The composition of the gases will, of course, depend upon the feed to the reforming zone and the precise character of the reaction and catalyst employed. Generally, the effluent gases will contain in addition to substantial quantities of hydrogen, some hydrogen sulfide and even ammonia.

When the catalyst is promoted with hydrogen chloride, it has been discovered that ammonium chloride or ammonium chloride-forming constituents are also contained in the reforming effluent gases and that when a compressing zone is employed, say, a turbine compressor, ammonium chloride deposits as a solid on the blades of the compressor, unbalancing the same and necessitating expensive repeated shut-downs. Thus, the turbine rotor which revolves at about 9000 r.p.m., more or less, must be periodically cleaned to remove the ammonium chloride deposits which have formed thereon. The ammonia is believed to result from reforming nitrogen-containing compounds, when these are present, in the feed stock which is reformed. Thus, if the stock to be reformed contains nitrogen, ammonia is likely to be formed through combination of the nitrogen and hydrogen. And, if hydrogen chloride injection is practiced, clearly, then, constituents to form ammonium chloride will be present in the gases separated from the reforming zone effluent. Compression of the gases using equipment upon which deposits of ammonium chloride lead to difficulty becomes needlessly expensive.

It is an object of this invention to provide a hydrocarbon reforming process. Another object of this invention is to provide a hydrocarbon reforming operation in which the gases obtained from the reforming or conversion zone can be compressed employing standard turbine-type compressor units without having periodically to shut down these units to clean ammonium chloride therefrom.

Other aspects, objects and the several advantages of the invention are apparent from the study of this disclosure, the drawings and the claims.

According to this invention, there is provided a process which comprises reforming a hydrocarbon in the presence of a catalyst under conditions producing a hydrocarbon reforming or conversion zone effluent containing gases including ammonium chloride or ammonium chloride-forming constituents which deposits upon compressor equipment subsequently used as solid ammonium chloride and wherein the said gases are contacted with a material which will remove from said gases ammonium chloride or ammonium chloride-forming constituents to a substantial extent, thus to avoid build-up of ammonium chloride in the gases in the process.

In the drawing, there is shown a simplified flow diagram in which the principal units which are believed necessary to a complete understanding of this invention have been shown schematically.

Referring now to the drawing, a charged naphtha boiling in the range from about 50° F. to about 425° F. is passed by way of pipe 1 into reforming heater 2 together with hydrogen-containing gases recycled to the heater by way of pipe 3. In the heater, this charge stock is rapidly heated to a temperature of about 890° F. and charged together with a very small quantity of hydrogen chloride by way of pipe 4 to catalytic reforming zone 5. The hydrogen chloride is shown introduced by way of pipe 4'. Although in this example, the hydrogen chloride is shown introduced to transfer line 4, it is within the scope of the invention to introduce the hydrogen chloride in any other manner, it being essential only, according to the invention, that ammonim chloride or ammonium chloride-forming constituents be present in the effluent from catalytic reforming zone 5. The effluent from zone 5 is passed by way of pipe 6 to gas separator 7, bottoms from which, removed by way of pipe 8, constitute the reformate. Overhead gases are taken by way of pipe 9 to adsorber zone 10. In this zone, the gases are contacted with a suitable adsorbent, in this example, activated charcoal. Although only two adsorbers are shown in the drawing, for sake of simplicity, it will be obvious to those skilled in the art in possession of this disclosure that several adsorber zones can be employed either simultaneously or successively. Also, one zone can be undergoing regeneration while another zone is being employed to remove the ammonium chloride or ammonium chloride-forming constituents from the gases. The gases from which ammonium chloride or ammonium chloride-forming constituents have been removed are passed by way of pipe 11 to compressor 12 which compresses the gases into pipe 3 for reuse as already described.

In the drawing, adsorber zone 10 is shown preceding the compressor. It is within the scope of the invention to locate the adsorber after the compressor. However, at present writing, this modification is not preferred over the modification which has been described. It will, however, be noted that the hydrogen-containing gases pass through the operation repeatedly and that, therefore, in its broadest aspect, the invention contemplates merely substantially reducing the ammonium chloride or ammonium chloride-forming constituents at some point in the system. Obviously, to the extent that substantially all of the ammonium chloride is removed, the invention is practiced in the highest degree. Also, to the extent ammonium chloride is removed or the ammonium chloride-forming constituents are removed prior to the compressor, there will be the least amount of deposit occurring therein.

The gas separator in this example is operated at a fairly low temperature compared with that in zone 5. Thus, as it is usual in plant practice to do and as will be understood by one skilled in the art in possession of this disclosure, there will be interposed between zone 5 and gas separator 7 suitable heat exchanger or cooler to bring the effluent from zone 5 down to a temperature at which gas from liquid separation can be practiced. Thus, the temperature in the gas separator, in this example, is approximately 100° F. Reformate removed by pipe 8 is in substantially liquid phase.

According to the invention, the adsorber can be operated at any desired temperature at which ammonium chloride will deposit in the activated charcoal. In this example, the adsorber is operated at ambient temperature. At this temperature, the maximum deposition of ammonium chloride is obtained without having to employ refrigeration.

In a specific plant operation, the ammonium chloride deposition problem was discovered to necessitate shutdown every six to eight weeks to remove ammonium chloride deposit from turbine blades which became so unbalanced as to endanger the useful life of the compressor and the personnel working in its proximity. The compressor to which reference is here made is operated at 9000 r.p.m. Cleaning of the compressor blades again permits the compressor to rotate smoothly and use of an adsorber according to the invention substantially entirely eliminates these expensive shut-downs.

In the drawing, there is further shown, in dashed lines, the regeneration gas heater 13 with the hydrogen-containing gas line 14 leading thereto. Zone 10' is a second sorption zone which is undergoing regeneration. Heated gas from heater 13 is passed by way of line 15 through the bed of adsorbent to remove the adsorbed materials thereon including ammonium chloride and any sulfides which are present. The regeneration effluent gas is removed by way of lines 16 and 17. The drawing shows two sorption units; one on the adsorption cycle, unit 10, and one on the regeneration cycle, unit 10'. The switching on and off of the various valves to change from one cycle to the other is obvious from reading the drawing.

It is further within the scope of this invention to use a liquid absorbent or chemical reagent to remove the undesirable components from the separator gas 9. Sulfuric acid is especially advantageously employed since the ammonium portion of the non-desirables is reacted to ammonium bisulfate, remaining in the acid, and the hydrogen chloride portion passes through the system and is recycled with the recycle hydrogen-containing gases. Such hydrogen chloride recycle minimizes the requirement for make up chlorides introduced by way of pipe 4'.

In another operation, there is charged by way of line 1 a naphthenic gasoline boiling in the range of 150 to 400° F. containing therein organic nitrogen compounds which existed originally in the crude oil from which the naphthenic gasoline is prepared, or which are produced by a previous refining step. The naphthenic gasoline is comprised of about, by volume percent: parafinics—55 percent, naphthenics—40 percent, and aromatics—5 percent. Recycle hydrogen-containing gas is introduced via line 3. The mol ratio of hydrogen to hydrocarbon is about 7.5 to 1.0. One pound of anhydrous hydrogen chloride per 2,000 barrels of hydrocarbon feed in line 1 is added by way of line 4'. The chloride addition is made to maintain the desired chloride concentration in the reforming catalyst. The catalyst is a platinum-containing catalyst, the platinum being supported on a fluorinated alumina base, the platinum content being 0.8 weight percent. The fluorine content is about 3.0 weight percent. The remainder of the catalyst is alumina.

After reforming of the feed material occurs in zone 5, the reactor effluent is cooled and is passed by way of line 6 to separator 7. Reformate, unstabilized, is removed as liquid by way of line 8, and the conventional recycle gas effluent 9 comprises.

|  | Mol percent | Grains per 100 cu. ft. |
|---|---|---|
| Hydrogen | 89.5 |  |
| Methane | 4.0 |  |
| Ethane | 3.0 |  |
| Propane | 2.0 |  |
| Butanes, plus | 1.5 |  |
| Hydrogen sulfide |  | [1] 2.0 |
| Hydrogen chloride |  | [1] 0.5 |
| Ammonia, $NH_3$ |  | [1] 0.3 |

[1] Reported in uncombined form.

When passing this recycle stream 9 through sorption zone 10 of the invention using as an adsorbent activated carbon, in this example, the recycle hydrogen containing gas in line 3 has negligible (too small to measure) quantities of $H_2S$, HCl, and $NH_3$ components. And compressor 12 does not have deposit trouble which has been found in the reforming operation when the sorption step of the invention is not employed.

In the above specific example, anhydrous hydrogen chloride was used as the chlorine-containing material. Other chlorine-containing materials which can be used include chlorine, sodium chloride, hydrochloric acid, etc. The platinum-type catalyst may range up to about 8.0 weight percent fluorine and between about 0.01 to 5.0, preferably 0.1 to 1.0 weight percent platinum, the remainder being alumina.

Reasonable variation and modification are possible within the scope of the foregoing disclosure, the drawing and the appended claims to the invention, the essence of which is that in a hydrocarbon reforming operation in which the effluent gases contain ammonium chloride-forming constituents or ammonium chloride, and in which a compressor is employed, the gases are contacted with an adsorbent or absorbent to remove therefrom substantial quantities of ammonium chloride or ammonium chloride-forming constituents, thus to obviate difficulties encountered due to unbalancing, etc., of compressor rotors upon which ammonium chloride otherwise becomes deposited.

I claim:

1. A hydrocarbon reforming operation in which a hydrocarbon charge is converted at elevated temperature in the presence of hydrogen and a reforming catalyst which is promoted with hydrogen chloride and in which charge there are contained gases including nitrogen resulting in ammonium chloride in the gases separated from the reforming effluent, the steps in combination of contacting said gases with an adsorbent to remove ammonium chloride therefrom, compressing the said gases and returning the gases to the process for reuse.

2. A process according to claim 1 wherein the adsorbent is selected from the group consisting of activated charcoal, activated alumina, silica gel, molecular sieves, and coke.

3. A process according to claim 1 wherein the hydrocarbon is comprised in a feed stock boiling substantially in the gasoline-boiling range, the catalyst is a platinum-type reforming catalyst and the reforming operation is conducted at a temperature in the range 800–950° F.

4. A process according to claim 1 wherein a centrifugal compressor is employed.

5. A hydrocarbon reforming operation in which a hydrocarbon charge is converted at elevated temperature in the presence of hydrogen and a reforming catalyst which is promoted with hydrogen chloride and in which charge there are contained gases including nitrogen resulting in ammonium chloride in the gases separated from the reforming effluent, the steps in combination of contacting said gases with an adsorbent to remove ammonium chloride therefrom, then compressing the said gases and returning the gases to the process for reuse.

6. In a hydrocarbon reforming operation in which a hydrocarbon charge is converted at elevated temperature in the presence of hydrogen and a reforming catalyst to which said charge is fed together with a hydrogen chloride promoter and in which charge there are contained gases including nitrogen, the charge being converted to yield a fraction suitable for use in gasoline, and during which conversion there is formed ammonium chloride which is separated in the gases which are separated from the reforming effluent, the steps in combination of contacting said gases with an adsorbent to remove ammonium chloride therefrom, compressing the said gases and returning the gases to the process for reuse.

References Cited in the file of this patent
UNITED STATES PATENTS

| | | |
|---|---|---|
| 2,642,384 | Cox | June 16, 1953 |
| 2,691,623 | Hartley | Oct. 12, 1954 |